United States Patent [19]

Gersmann

[11] Patent Number: 5,094,501
[45] Date of Patent: Mar. 10, 1992

[54] SIDE DOOR CONSTRUCTED AS SLIDING DOOR FOR PASSENGER MOTOR VEHICLES

[75] Inventor: Klaus Gersmann, Munich, Fed. Rep. of Germany

[73] Assignee: Bayerische Motoren Werke AG, Fed. Rep. of Germany

[21] Appl. No.: 299,802

[22] PCT Filed: Jul. 31, 1987

[86] PCT No.: PCT/EP87/00422
§ 371 Date: Jan. 9, 1989
§ 102(e) Date: Jan. 9, 1989

[87] PCT Pub. No.: WO88/00892
PCT Pub. Date: Feb. 11, 1988

[30] Foreign Application Priority Data
Jul. 31, 1986 [DE] Fed. Rep. of Germany ....... 3625936

[51] Int. Cl.$^5$ .............................................. B60J 5/06
[52] U.S. Cl. ................................................... 296/155
[58] Field of Search ...................................... 296/155

[56] References Cited

U.S. PATENT DOCUMENTS

| | | |
|---|---|---|
| 1,193,707 | 8/1916 | Masury . |
| 1,864,048 | 6/1932 | McNutt ........................... 296/155 |
| 2,263,062 | 11/1941 | Allen ............................... 296/155 |
| 2,622,919 | 12/1952 | Scott . |
| 2,651,541 | 9/1953 | Surles . |
| 4,034,509 | 7/1977 | De Rees . |

FOREIGN PATENT DOCUMENTS

| | | |
|---|---|---|
| 858929 | 10/1952 | Fed. Rep. of Germany ...... 296/155 |
| 5895409 | 11/1953 | Fed. Rep. of Germany . |
| 2018319 | 9/1974 | Fed. Rep. of Germany . |
| 3725517 | 10/1988 | Fed. Rep. of Germany ...... 296/155 |
| 961405 | 5/1950 | France . |
| 2235259 | 6/1973 | France . |
| 2584127 | 1/1987 | France ............................... 296/155 |
| 225087 | 4/1943 | Switzerland ....................... 296/155 |
| 8701992 | 4/1987 | World Int. Prop. O. . |

*Primary Examiner*—Margaret A. Focarino
*Assistant Examiner*—Gary C. Hoge
*Attorney, Agent, or Firm*—Evenson, Wands, Edwards, Lenahan & McKeown

[57] ABSTRACT

In a sliding door for motor vehicles, especially passenger motor vehicles, which for purposes of opening is lowerable into the vehicle body, the door body assumes in the lowered position, in which it receives the window in the lowered position thereof, an essentially vertical position. A coupling is provided for the simultaneous movement of the door body and window.

37 Claims, 11 Drawing Sheets

SIDE DOOR CONSTRUCTED AS SLIDING DOOR FOR PASSENGER MOTOR VEHICLES

The invention relates to a side door constructed as sliding door for passenger motor vehicles, according to the preamble of claim 1. In a side door of this type known from the DE-B 895 409, after the lowering of the window into the door body, the latter can be lowered together with the window into a receiving space underneath the vehicle seat arranged adjacent the sliding door. In the lowered position, the door body assumes an essentially horizontal position. For the guidance of the sliding door, two springily supported guide rollers with axes of rotation disposed perpendicular to the door wall are provided at the door body at each end, which protrude beyond the body ends and engage in guide rails at the fixed vehicle body. For the opening and closing of the sliding door, an electro-motorized drive is provided. However, also an emergency actuation by hand is possible. Both during electro-motorized actuation as also during an actuation by hand, the lowering of the door body always requires the preceding complete lowering of the window. During the closing of the side door, the window reversely can be lifted out of its lowered position only after the door body has been moved completely into its closing position. For the manual actuation, a handle and a foldable grip are arranged at the upper edge of the window. The known arrangement is costly and can be actuated manually only in a complicated manner.

Other sliding doors lowerable into the vehicle body are known from the DE-AS 20 18 319, FR-PS 961 405 and US-PS 26 51 541.

The invention is concerned with the task to create a side door of the aforementioned type which requires relatively little expenditure and can be actuated in an easy and simple manner.

The solution of this task is indicated in the characterizing part of the claim 1. It is achieved by the same with simple means that the lateral vehicle-longitudinal bearer (door sill beam) can serve for receiving the side door in the lowered position. With an opened side door, an ingress opening is present the height of which amounts to about two-thirds of the dimension from the door sill beam lower edge to the roof frame. This is an acceptable value for sporty vehicles. For vehicles with an open body, the side door according to the invention is particularly advantageous. It can be stored in a simple manner not only in the open condition but enables a simple and fast opening and closing by reason of the far-reaching maintenance of its vertical arrangement.

Embodiments of the invention are characterized in the dependent claims. Advantages, which are connected therewith, follow from the following description.

Embodiments of the invention are schematically illustrated in the drawing, and more particularly there is shown FIG. 1 a first side door both in the closed as also in the opened condition in perspective view, FIG. 2 the sliding door according to FIG. 1 in a vertical cross section, FIGS. 3 and 4 each a horizontal cross section through the guidances of the sliding door according to FIG. 1, FIG. 5 a second sliding door both in the closed as also in the opened condition in perspective view, FIG. 6 a third sliding door in the closed condition in perspective view, FIG. 7 the sliding door according to FIG. 6 both in the closed as also in the opened condition in perspective view, FIG. 8 a fourth sliding door with opened window in perspective view, FIG. 9 the sliding door according to FIG. 8 in the opened condition in perspective view, FIG. 10 a fifth sliding door both in the closed as also in the opened condition in perspective view, FIG. 11 a sixth sliding door in the closed condition in perspective view and FIG. 12 a seventh sliding door in the closed condition in perspective view.

In the embodiment according to FIGS. 1 to 4, a receiving space 2 open in the upward direction is provided in the left longitudinal bearer 1 (door sill beam) of a sporty two-seater passenger motor vehicle with open body not further illustrated. The entire door body 3 of the sliding door 4 arranged above the longitudinal bearer 1 and constructed as side door can be lowered into the receiving space 2 essentially in vertical position. The door body 3 carries a window 5 which can be lowered into the door body 3. The door body 3 includes at its rear end at the upper edge which forms a window railing, a door grip 6 which serves for the opening and closing of the sliding door 4.

The guidance of the door body 3 and of the window 5 takes place by way of rollers which run in guide rails. A guide rail 8 is secured at the inside of the left vehicle side wall 7 which adjoins toward the rear the rear end of the sliding door 4, which guide rail 8 extends essentially in the vertical direction and has angle flanks. The door body 3 carries one roller unit each at its upper and lower end with vertical spacing from one another, whose rollers 9 run in the guide rails 8 and are guided by the angle flanks thereof. Thus, both forces transversely to the vehicle longitudinal direction as also in the vehicle longitudinal direction can be absorbed at this guidance 8, 9. Additionally, moments both about an axis extending in the vehicle longitudinal direction as also about an axis extending transversely to the vehicle longitudinal direction can be absorbed. By contrast, a guide rail 12 with essentially U-shaped cross section is provided at the left forward body post 10 (A-column), adjacent to which is arranged the left forward vehicle side wall 11; guide rollers (not shown) of a forward roller unit of the door body 3 engage in the guide rail 11. The rollers of the forward roller unit run along the inside of the U-legs of the guide rail 12. This guidance enables a tolerance compensation in the longitudinal direction and permits angular errors. Accordingly, it absorbs forces transversely to the vehicle longitudinal direction. The other roller unit is arranged approximately at half the height of the door body 3.

A guide rail 13 with angle flanges is arranged in the door body 3 at the rear end for the guidance of the window 5. Two guide rollers 14 arranged with a vertical spacing from one another run in this guide rail 13, which are supported at a roller mounting 15 of the window 5. The roller mounting 15 is secured at the window 5 at the lower end thereof. The rear guidance 13, 14 like the adjacent guidance 8, 9 of the door body 3 absorbs forces both in the vehicle longitudinal direction as also transversely to the vehicle longitudinal direction. It also absorbs moments about an axis extending in the vehicle longitudinal direction and about an axis extending transversely to the vehicle longitudinal direction. At the forward end of the window 5, the latter carries at a forward roller mounting 16 two guide rollers 17 arranged with vertical spacing from one another. The guide rollers 17 run in a forward guide rail 18 which is arranged in the door body 3 and has an approximately U-shaped cross section. The forward guide rollers 17 are supported at the inner sides of the U-legs of the forward guide rail 18. The forward guidance 17, 18 accordingly absorbs both forces transversely to the vehicle longitudinal direction as also moments about an axis extending in the vehicle longitudinal direction. The window 5 is therefore retained at both ends against lateral tilting differently from the door body 3.

In the illustrated embodiment, both the door grip 6 by way of which the displacement forces are introduced into the door body 3, as also the guide rails 8, 13 with angle flanges are arranged at the rear door end. In deviation from this embodiment, this arrangement may also be provided at the forward door end.

Figure 1:
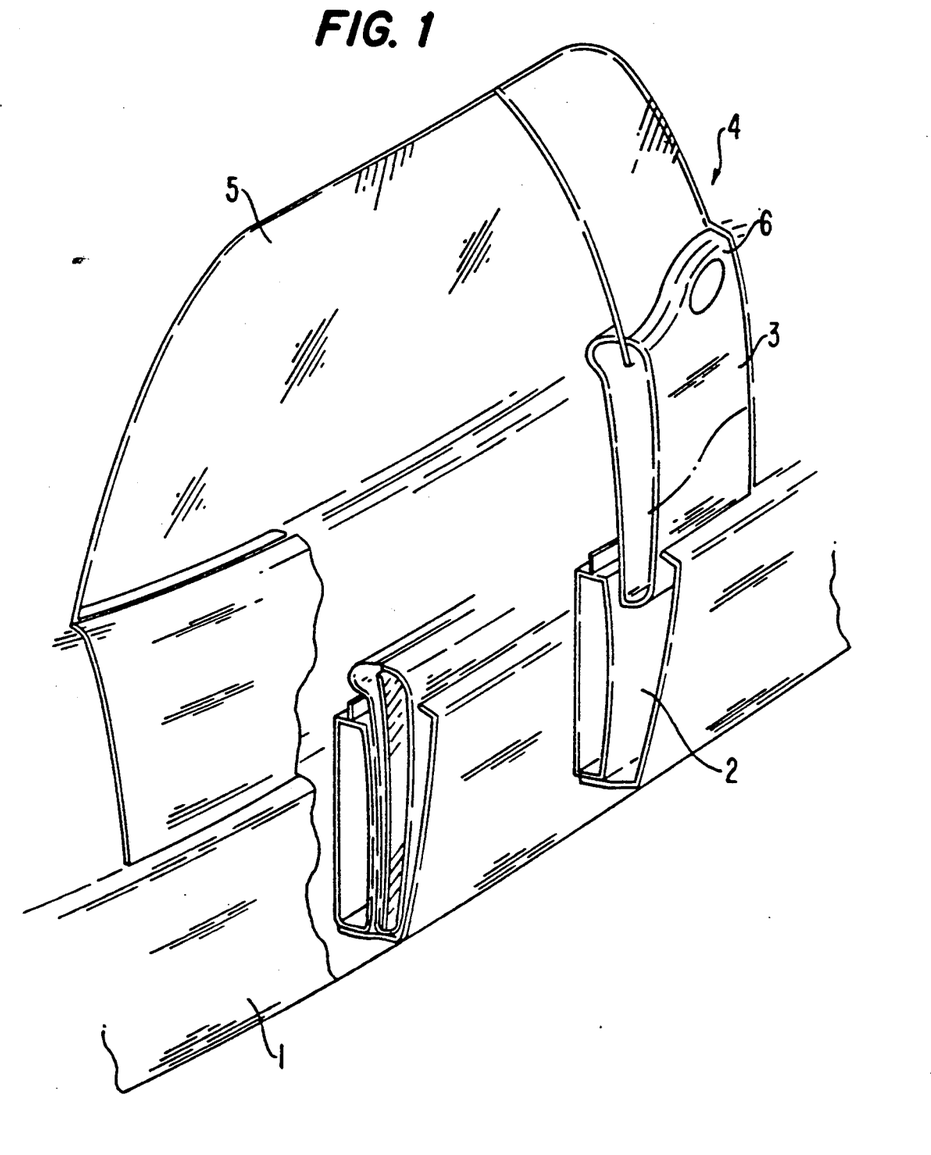
Figure 2:
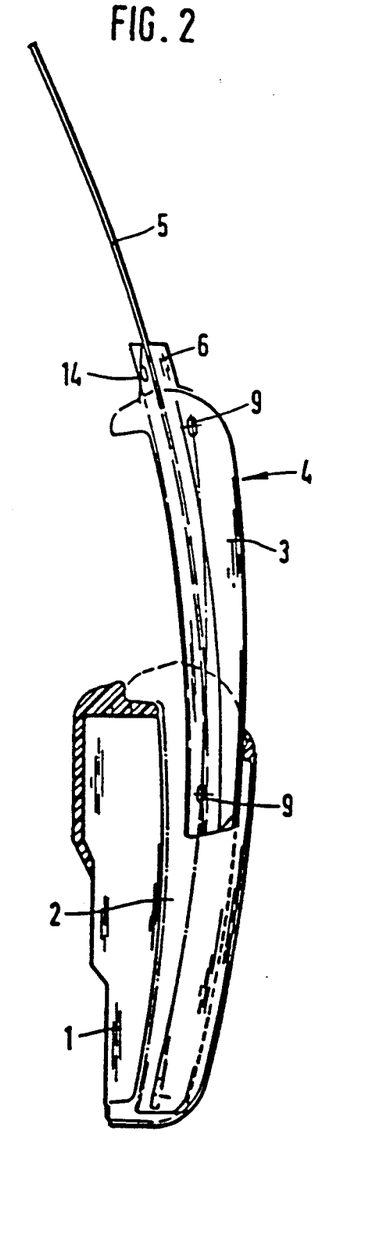
Figure 3:
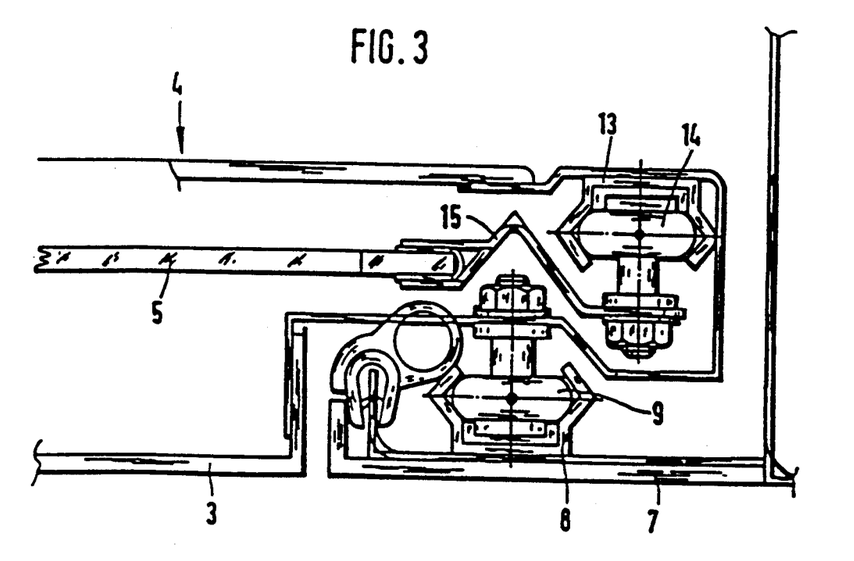
Figure 4:
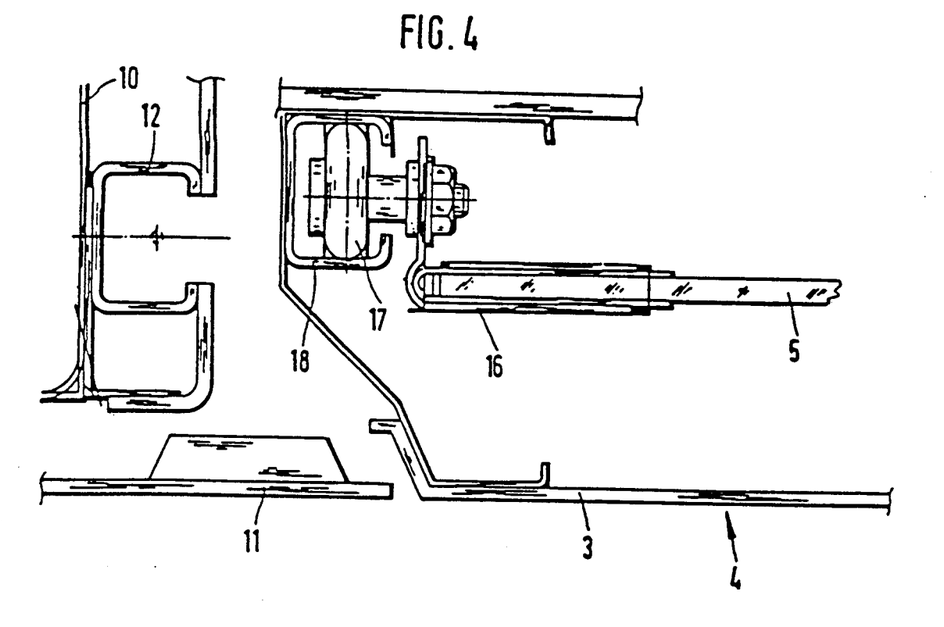
Figure 5:
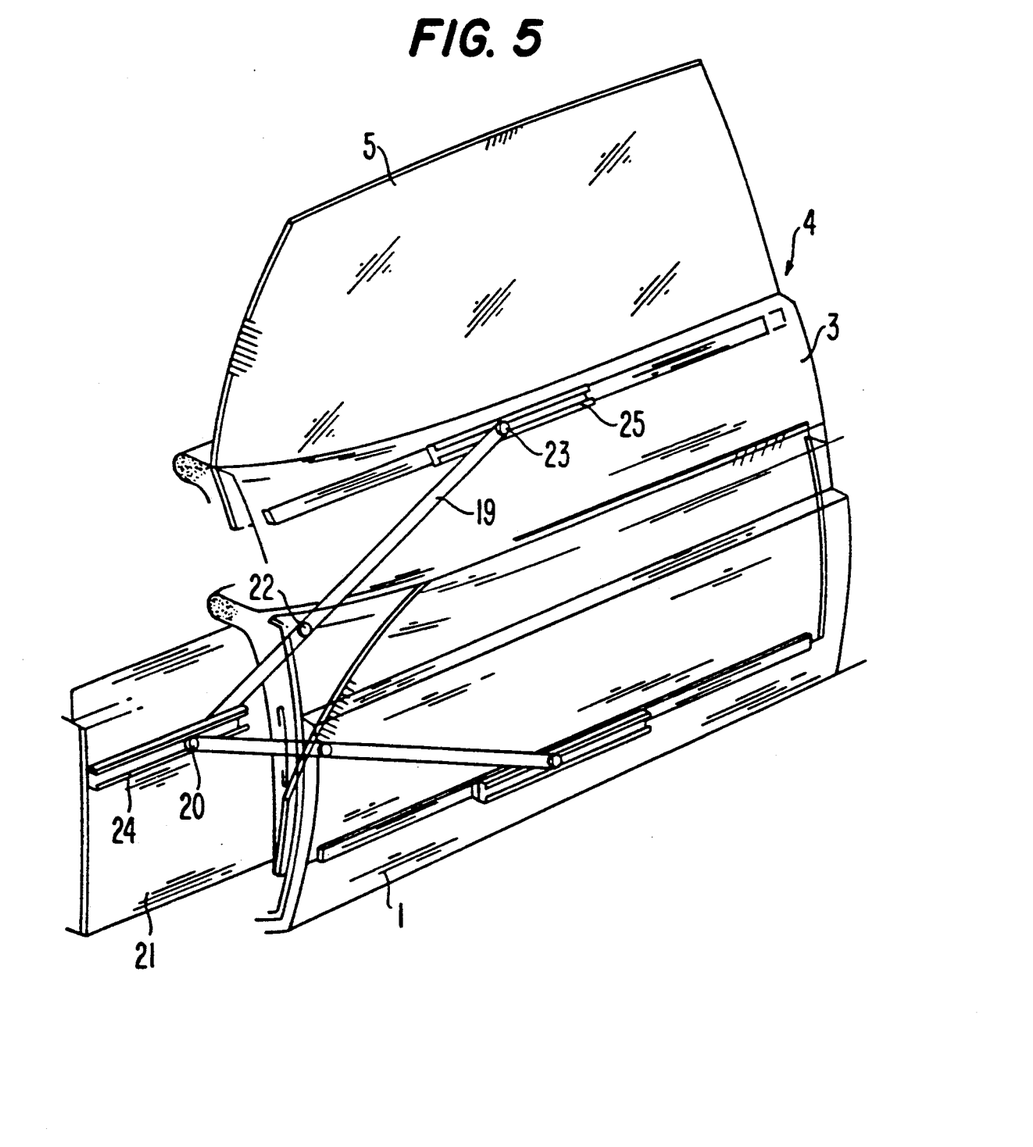

In the embodiment according to FIG. 5, a coupling lever 19 is provided which is connected by way of a first bearing support 20 with the fixed vehicle body 21, by way of a second bearing support 22 with the door body 3 and by way of a third bearing support 23 with the window 5. The second bearing support 22 at the door body 3 is constructed as pivot bearing support. The first bearing support 20 at the fixed vehicle body 21 is constructed as connecting link guide with a guide track 24 provided at the fixed vehicle body 21. The third bearing support 23 at the window 5 is also constructed as connecting link guide with guide track 25 arranged at the window 5. The guide tracks 24, 25 are arranged parallel to one another and extend in the vehicle longitudinal direction. The second bearing support 22 at the door body 3 is arranged near the forward end of the sliding door 4. The coupling lever 19 protrudes therefore beyond the forward end of the sliding door 4. The distance of the third bearing support 23 from the second bearing support 22 is about twice as large as the distance of the first bearing support 20 from the second bearing support 22. The ratio of the two lever arms of the rectilinearly constructed double-armed coupling lever 19 corresponds to the lift movements of the door body 3 and of the window 5.

For the opening of the sliding door 4, the door body 3 after an unlocking of the door lock is pushed downwardly into the receiving space 2 of the longitudinal bearer 1. The window 5 is thereby simultaneously displaced downwardly into the door body 3 by the forced coupling which is effected by the coupling lever 19. In the lowermost position of the door body 3, the window 5 is completely lowered into the same. The two extreme positions of the door body 3 and of the window 5 are illustrated in FIG. 5.

The closing of the sliding door 4 takes place by lifting of the door body 3 whereby the window 5 slides upwardly out of the body 3 by means of the forced coupling.

Figure 6:
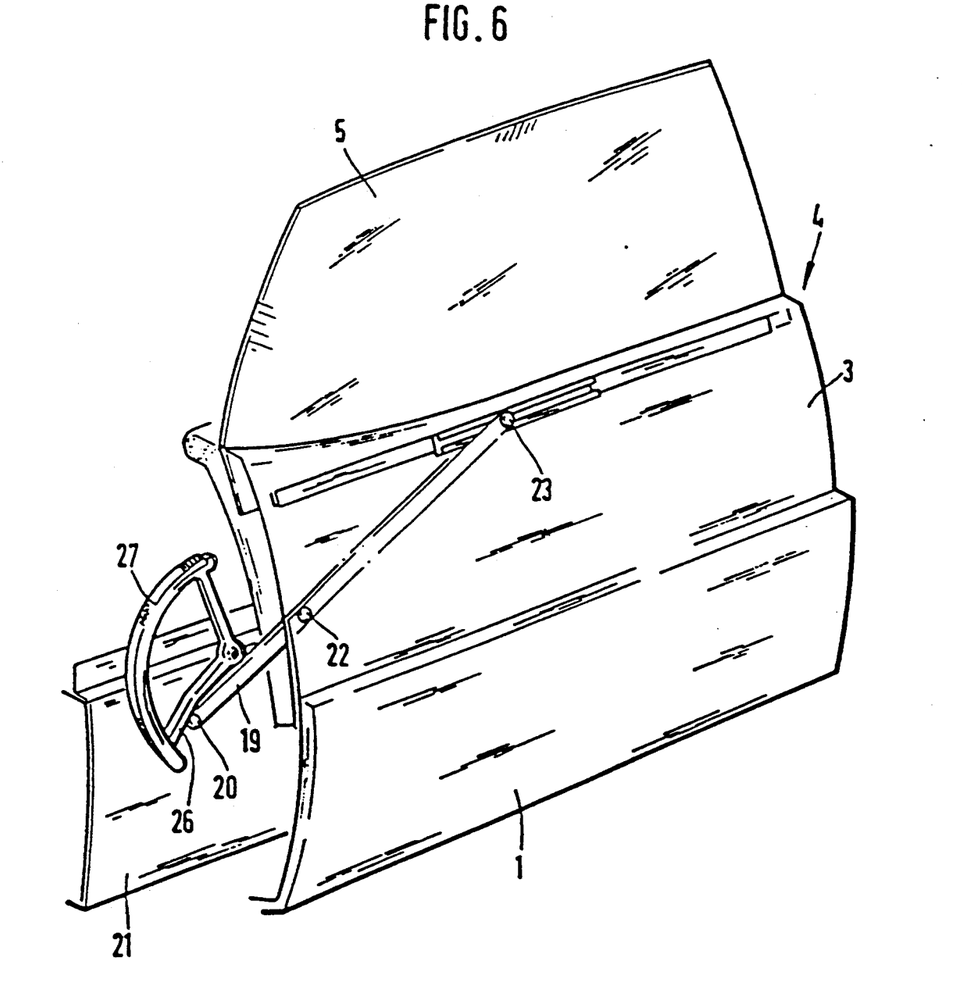

In the embodiment according to FIG. 6, the possibility is provided to open and close the window without the need that the door body 3 leaves its uppermost position, the closing position. For that purpose, a movable abutment 26 is provided for the first bearing support 20 at the fixed vehicle body 21 in lieu of the connecting link guide. The movable abutment 26 forms a support track, at which the body end of the coupling lever 19 is supported by means of a sliding member or a guide roller. The movable abutment 26 is connected with an arcuately shaped toothed segment 27 by way of which it can be adjusted. With a door body 3 disposed in the closing position, the movable abutment 26 acts as window lifter by way of the coupling lever 19.

If the movable abutment 26 is lifted by way of the toothed segment 27 either by hand or electro-motorized, the correspondingly spring-loaded body end of the coupling lever 19 follows this upward movement. As the second bearing support at the door body 3 assumes a fixed position, the window 5 will lower itself into the door body 3. The window can be completely opened in this manner.

Figure 7:
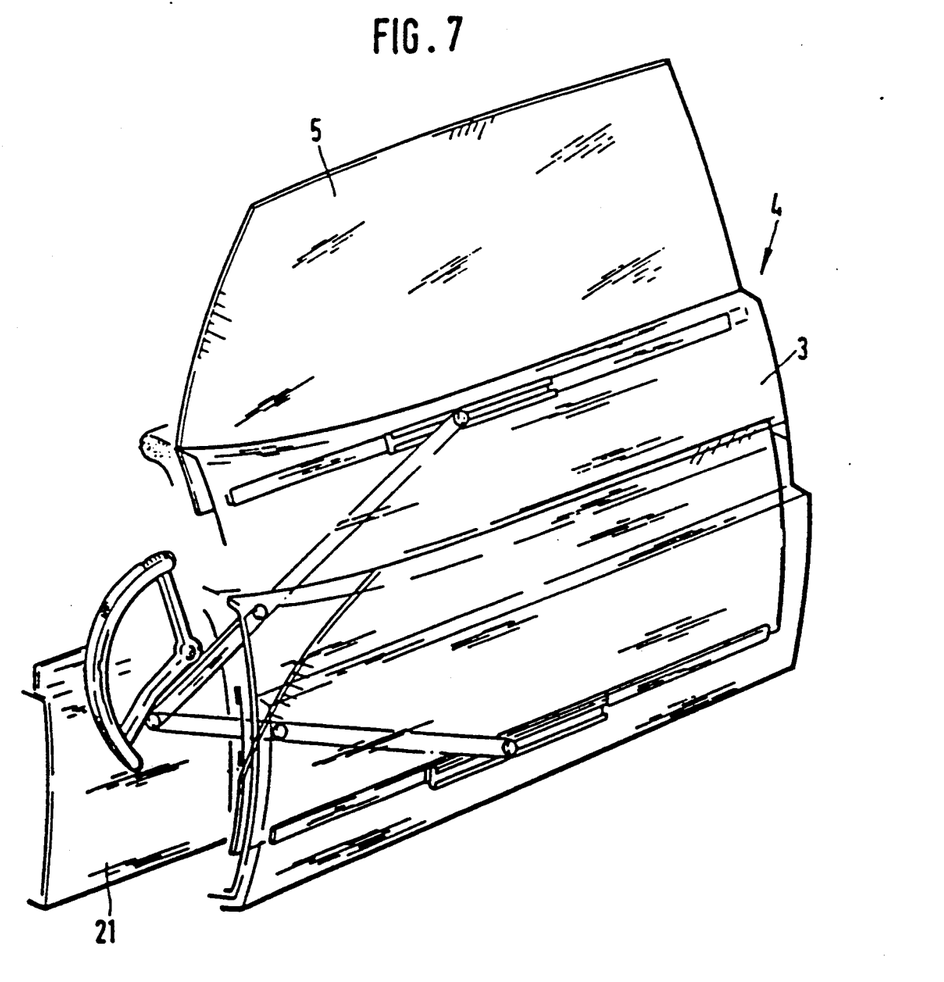

The closing of the window takes place by the reversed sequences. FIG. 7 illustrates the two extreme positions.

Figure 8:
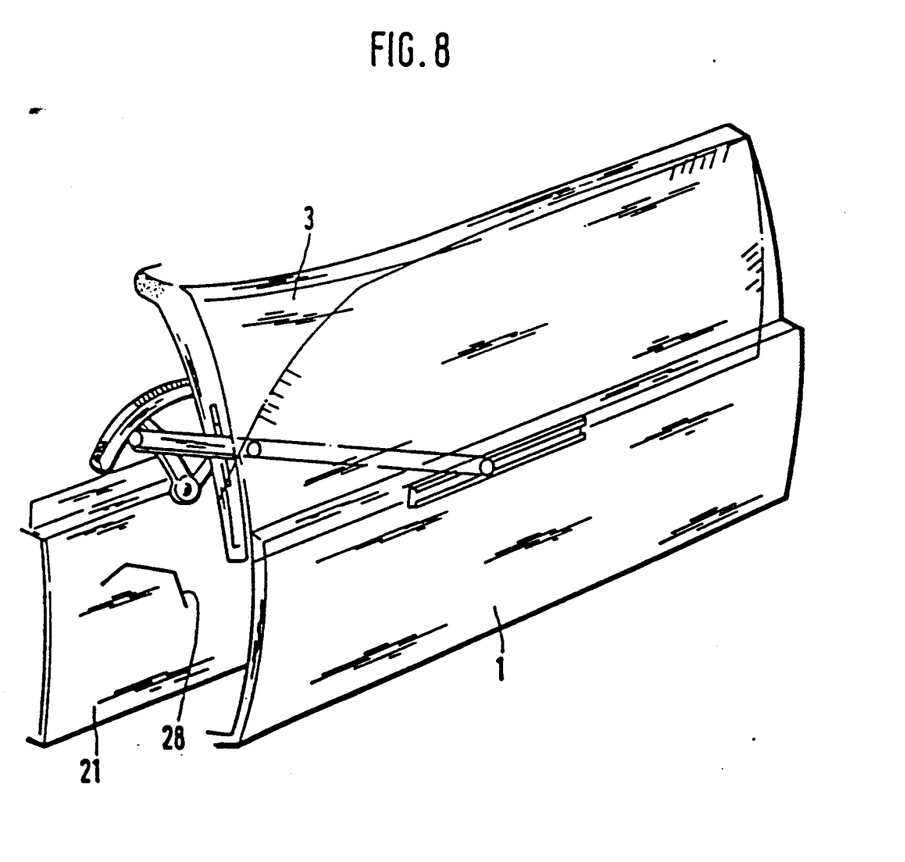
Figure 9:
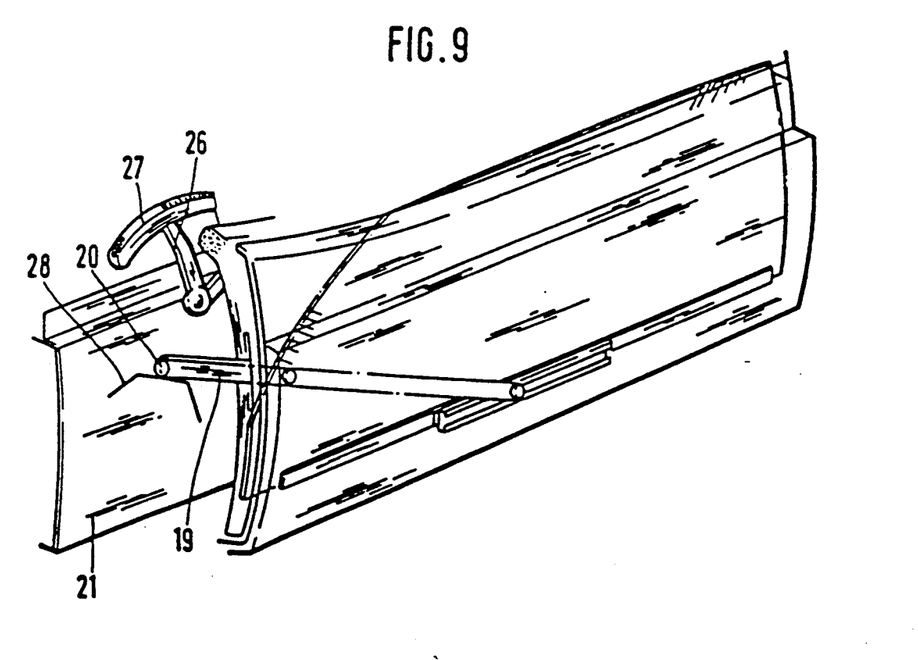

If the door body 3 is displaced downwardly with a partially opened window, at first the body end of the coupling lever 19 remains in abutment at the abutment 26. The window 5 therefore will further lower itself into the door body 3 during the downward movement of the door body. If the window 5 is completely lowered into the door body 3 with a completely raised door body, i.e., the window is completely opened (FIG. 8), or the window 5 is completely lowered into the door body 3 only after a certain displacement of the door body in the downward direction, the end of the coupling lever 19 will disengage itself from the abutment 26 during a further downward movement of the door body 3 and moves downwardly together with the door body 3. A fixed stop 28 at the fixed vehicle body 21 assures that the window 5 remains in the door body 3 with a lowered door body (FIG. 9).

During a closing of the sliding door 4, the door body 3 together with the window 5 and the coupling lever 19 moves upwardly until the end of the coupling lever 19 abuts at the movable abutment 26. During a further upward movement of the door body 3, the window 5 slides upwardly out of the door body. As soon as the door body 3 has reached its uppermost position in which it is locked at the fixed vehicle body, the window 5 has again assumed the previously adjusted position. It can now again be adjusted at will.

It is achieved by means of the movable abutment 26 that the window can be opened and closed at will with a closed sliding door 4. Every intermediate position is possible. It is nonetheless assured that during the opening of the sliding door 4 the window 5 is always lowered in the lowered door body 3 so that an ingress and egress is not impaired. It is additionally achieved that after a closing of the door the window will again assume the previously adjusted position.

Figure 10:
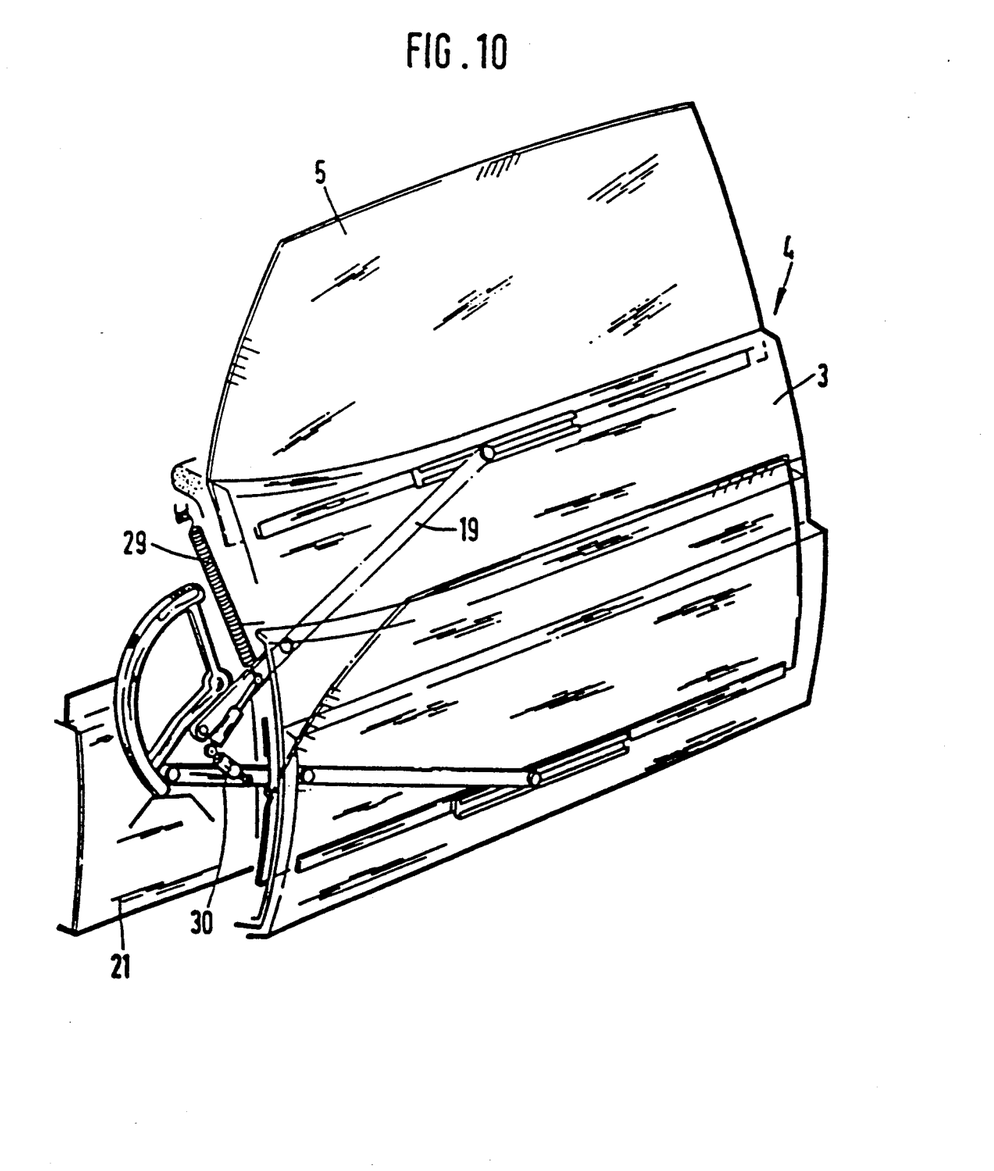

Provision is made in the embodiment according to FIG. 10 that a weight-compensating spring 29 engages with one of its ends at the coupling lever 19 at the lever arm protruding out of the sliding door 4, which is constructed as drawspring and is anchored with its other end at the fixed vehicle body 21. The weight-compensating spring 29 effects at the same time a pressing-on of the body end of the coupling lever 19 against the movable abutment 26.

A second spring 30 engages with one of its ends at the coupling lever 19 at the lever arm protruding out of the door body 3, which is constructed as gas spring and is also pivotally connected with its other end at the fixed vehicle body 21. The second spring 30 acts as over-center helper spring. With an open sliding door 4, it effects together with the door weight a keeping open (of the door). During the closing of the sliding door 4, it acts assistingly opposite the door weight for the closing beginning with a middle position. In FIG. 10, the two extreme positions are illustrated.

Figure 11:
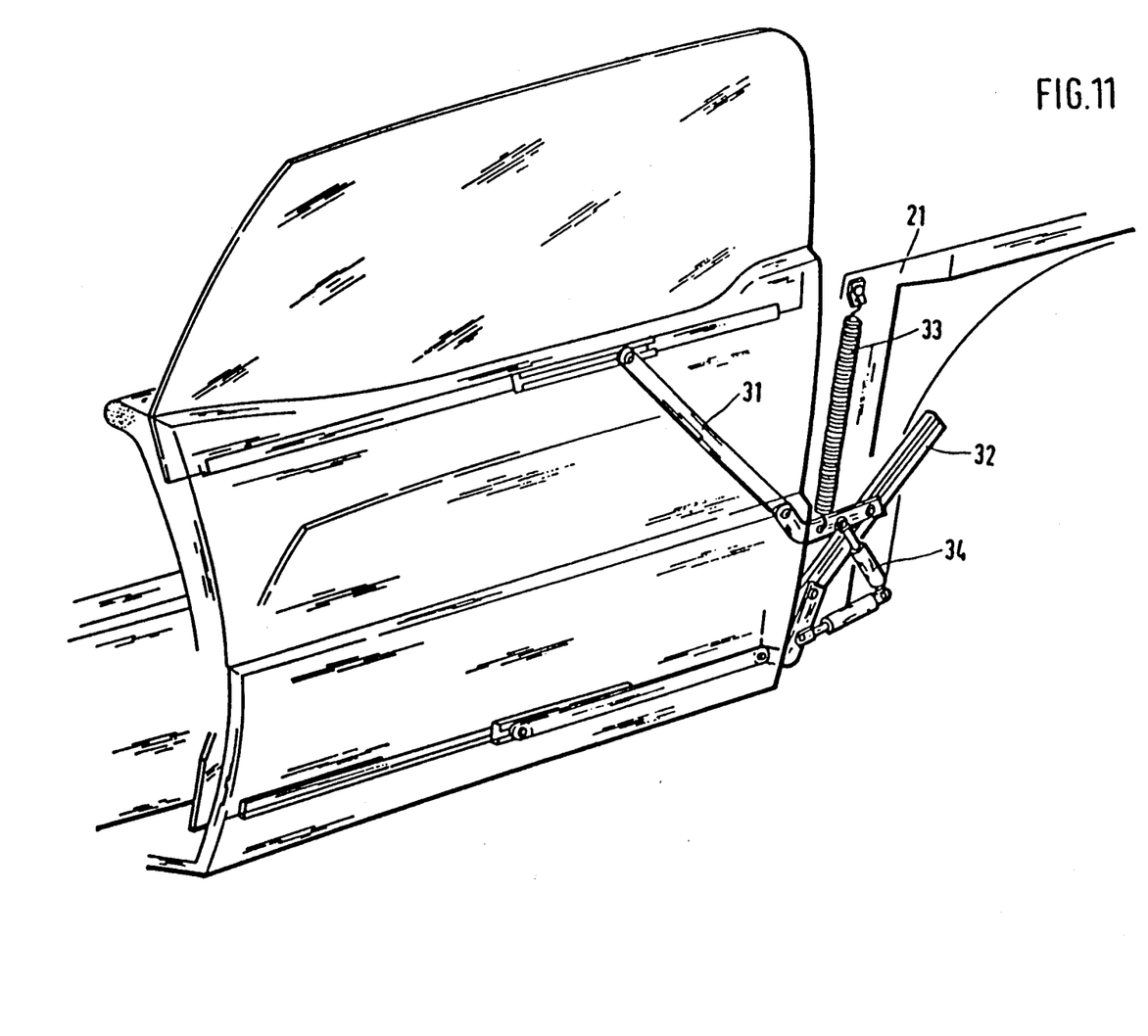

The embodiment according to FIG. 11 illustrates that the coupling 31, in lieu of at the forward door end, can protrude at the rear door end beyond the same. In this embodiment, however, not a rectilinear but an angularly bent coupling lever 31 is provided. Accordingly, an obliquely arranged track guide 32 is provided at the fixed vehicle body 21 as slide guidance. A weight-compensating spring 33 and a second spring 34 acting as over-center helper spring also engage at the angularly bent coupling lever 31.

Figure 12:
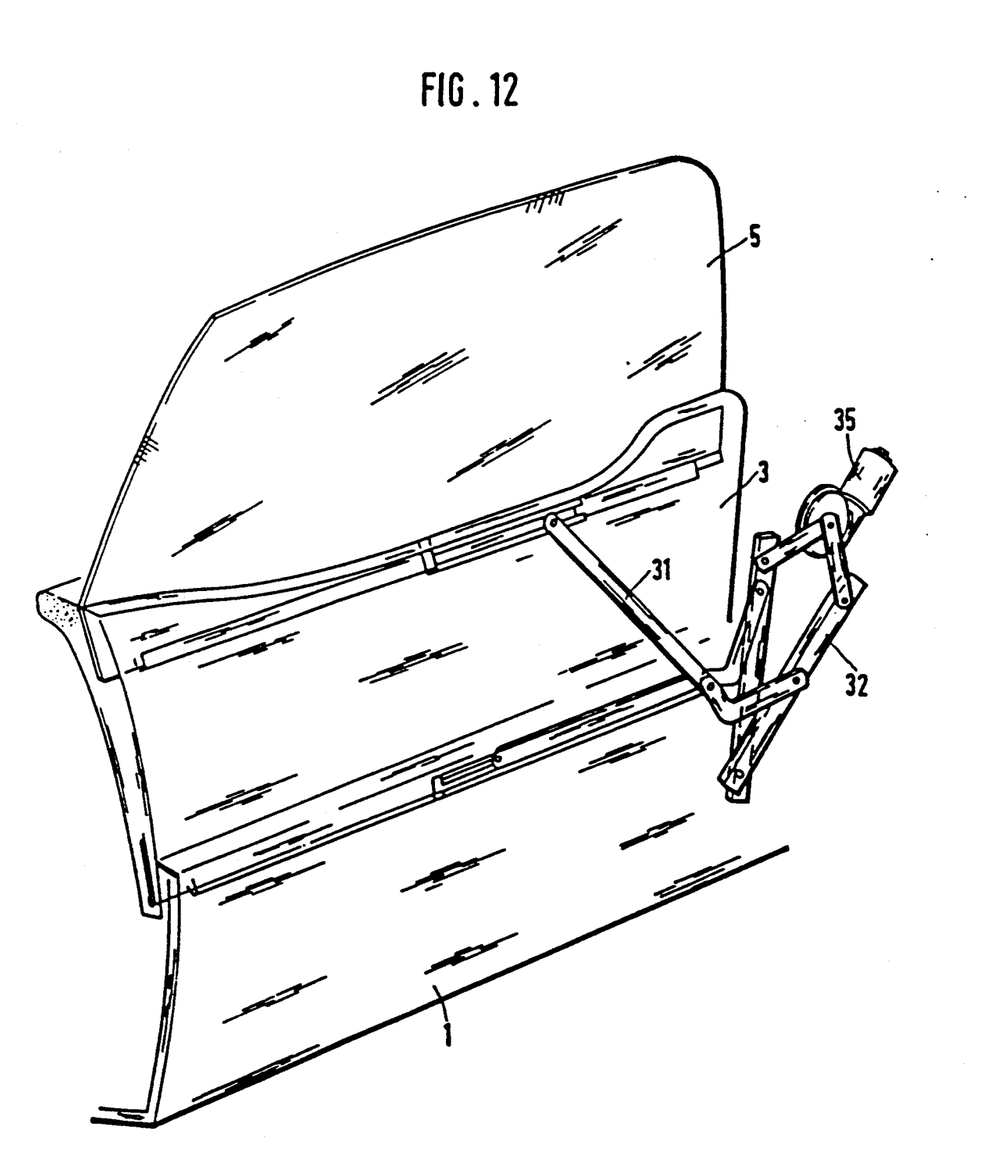

The embodiment according to FIG. 12 differs from that according to FIG. 11 in that the guide track 32 is movably supported at the fixed vehicle body 21. It can be pivoted out of the inclined position, which is shown in FIG. 11, about an axis extending transversely to the vehicle longitudinal axis into a position, in which it is arranged parallel with the guide rail 8 of the door body 3. The adjustment of the guide track 32 effects with a door body 3 disposed in the closed position and therewith with a fixed second bearing support 22 like the movable abutment 26 according to FIGS. 6 to 10 an opening, respectively, closing of the window. The adjustment of the guide track 32 can take place by a window lifter motor 35 or in deviation from the illustrated embodiment by hand. The two extreme positions are again shown in FIG. 12. The adjusting transmission can be so designed that the axis, about which the guide track 32 is pivotally supported at the fixed vehicle body, coincides with the pivot axis of the bearing support, with which the coupling lever 32 engages at the guide track 32, when the door is in the lower end position, i.e., is completely opened. With such a construction, a position of the window which is desired for the closed door can be adjusted beforehand with an open door by the pivoting of the guide track 32 without the need that the window 5 is lifted out of its lower position. During a subsequent closing of the door, the window is pushed upwardly only so far as corresponds to the pivot position of the guide track 32.

In lieu of the illustrated embodiments, also kinematic corresponding variations can be used. It is also possible to provide a motorized, preferably electro-motorized, drive for the sliding door.

Reference Numeral List

1 Longitudinal bearer (door sill beam)
2 Receiving space
3 Entire door body
4 Sliding door
5 Window
6 Door grip
7 Vehicle side wall, left rear
8 Guide rail
9 Guide roller
10 Body post (A-column), left
11 Vehicle side wall, forward left
12 Guide rail
13 Guide rail
14 Guide rollers
15 Roller mounting
16 Roller mounting, forward
17 Guide rollers, forward
18 Guide rail, forward
19 Coupling lever
20 First bearing support
21 Fixed vehicle body
22 Second bearing support
23 Third bearing support
24 Guide track
25 Guide track
26 Movable abutment
27 Toothed segment
28 Fixed abutment
29 Weight-compensating spring
30 Second spring
31 Angularly bent coupling lever
32 Guide track
33 Weight-compensating spring
34 Second spring
35 Window-lifter-motor

I claim:

1. A side door constructed as sliding door for passenger motor vehicles having laterally disposed longitudinal bearer means, comprising door body means carrying a window means operable to be lowered into the door body means, the door body means assuming an essentially vertical position when the door is closed, the door body means being lowerable into a respective longitudinal bearer means for purposes of opening the door and in the lowered position receiving the window means in the lowered position thereof, and the door body means also assuming an essentially vertical position in a lowered open door position thereof with a bottom portion of the door body means disposed adjacent the bottom of the longitudinal bearer means.

2. A sliding door according to claim 1, further comprising guide roller means arranged at two ends of the door body means, said guide roller means being operable to engage in guide rail means which are arranged at a vehicle body, the guide roller means and guide rail means constituting guide means, the guide means at one end of the door body means being so constructed that they can absorb forces directed transversely to a guide direction as also moments about axes directed transversely to the guide direction, and the guide means at the other end of the door body means being so constructed that they can absorb forces directed transversely to the door means.

3. A sliding door according to claim 2, wherein guide roller means are arranged at the window means at its two ends which engage in guide rail means that are arranged at the door body means.

4. A sliding door according to claim 3, wherein window guide means at one end of the window means include means for absorbing forces directed transversely to the guide direction and also moments about axes directed transversely to the guide direction, and wherein the guide means at the other end of the window means include means for absorbing forces directed transversely to the door.

5. A sliding door according to claim 4, wherein the guide means at the other end of the window means include means for absorbing moments about a substantially horizontal axis extending in the direction of the window means.

6. A sliding door according to claim 5, wherein the guide means for the door body means and the window means, which permit movement only in the guide direction, are arranged adjacent one another at one end of the door.

7. A sliding door according to claim 6, wherein the guide means of the window means permitting movement only in the guide direction are arranged further inwardly than the guide means of the door body means permitting movement only in the guide direction.

8. A sliding door according to claim 1, wherein a door handle is arranged at the upper edge of the door body means.

9. A sliding door according to claim 8, wherein the door handle is arranged at one end of the door body means.

10. A sliding door according to claim 9, wherein the door handle is arranged at the end of the door body means at which is arranged a guide means of the door body means permitting movement only in the guide direction.

11. A sliding door according to claim 1, further comprising coupling means between the door body means and the window means which is so constructed that a unidirectional adjusting movement of the window means with respect to the door body means can takes simultaneously with a unidirectional adjusting movement of the door body means with respect to the vehicle body.

12. A sliding door according to claim 11, wherein the coupling means includes a coupling lever having bearing support means at the vehicle body, at the door body means and at the window means.

13. A sliding door according to claim 12, wherein the bearing support means of the coupling lever at the window means is constructed as connecting link guide means.

14. A sliding door according to claim 13, wherein the connecting link guide means includes a guide track means arranged at a lower end of the window means.

15. A sliding door according to claim 14, wherein the guide track means is arranged at the outside of the window means.

16. A sliding door according to claim 12, wherein the bearing support means of the coupling lever at the vehicle body is constructed as connecting link guide means.

17. A sliding door according to claim 16, wherein the last-mentioned connecting link guide means includes a guide track means arranged at the vehicle body.

18. A sliding door according to claim 17, wherein the last-mentioned guide track means is movably arranged at the vehicle body.

19. A sliding door according to claim 12, wherein the bearing support means of the coupling lever at the vehicle body is formed by abutment means which is adjustable.

20. A sliding door according to claim 12, further comprising a weight-compensating spring means.

21. A sliding door according to claim 20, wherein the weight-compensating spring means is operatively connected with the coupling lever.

22. A sliding door according to claim 12, further comprising an over-center helper spring means which acts upon the sliding door means below a middle position in the downward direction and above the middle position in the upward direction.

23. A sliding door according to claim 22, wherein the over-center helper spring means is operatively connected with the coupling lever.

24. A sliding door according to claim 1, wherein guide roller means are arranged at the window means at its two ends which engage in guide rail means that are arranged at the door body means.

25. A sliding door according to claim 24, wherein the guide means at one end of the window means include means for absorbing forces directed transversely to a guide direction and also moments about axes directed transversely to the guide direction, and wherein the guide means at the other end of the window means include means for absorbing forces directed transversely to the door.

26. A sliding door according to claim 1, wherein the combined vertical height of the window means and door body means when in a closed door and closed window position is substantially greater than the vertical height of the longitudinal bearer means.

27. A sliding door according to claim 11, wherein the coupling means includes bearing support means at the vehicle body, at the door body means and at the window means.

28. A sliding door according to claim 27, wherein the bearing support means of the coupling means at the vehicle body is constructed as guide track means.

29. A sliding door according to claim 28, wherein the bearing support means of the coupling means at the window means is constructed as guide track means.

30. A sliding door according to claim 29, wherein the bearing support means of the coupling means at the vehicle body is formed by abutment means which is adjustable.

31. A sliding door according to claim 30, further comprising a weight-compensating spring means.

32. A sliding door according to claim 31, further comprising an over-center helper spring means which acts upon the sliding door means below a middle position in the downward direction and above the middle position in the upward direction.

33. A sliding door according to claim 27, further comprising guide roller means arranged at two ends of the door body means, said guide roller means being operable to engage in guide rail means which are arranged at the vehicle body, the guide roller means and guide rail means constituting guide means, the guide means at one end of the door body means being so constructed that they can absorb forces directed transversely to a guide direction as also moments about axes directed transversely to the guide direction, and the guide means at the other end of the door body means being so constructed that they can absorb forces directed transversely to the door means.

34. A sliding door according to claim 33, wherein guide roller means are arranged at the window means at its two ends which engage in guide rail means that are arranged at the door body means.

35. A side door constructed as sliding door for passenger motor vehicles having laterally disposed longitudinal bearer means, comprising door body means carrying a window means operable to be lowered into the door body means, the door body means assuming an essentially vertical position when the door is closed, the door body means being lowerable into a respective longitudinal bearer means for purposes of opening the door and in the lowered position receiving the window means in the lowered position thereof, and the door body means also assuming an essentially vertical position in a lowered position thereof;

wherein guide roller means are arranged at the window means at its two ends which engage in guide rail means that are arranged at the door body means; and wherein the guide means at one end of the window means include means for absorbing forces directed transversely to a guide direction as also moments about axes directed transversely to the guide direction, and wherein the guide means at the other end of the window means include means for absorbing forces directed transversely to the door.

36. A sliding door according to claim 35, wherein the guide means at the other end of the window means include means for absorbing moments about a substantially horizontal axis extending in the direction of the window means.

37. A sliding door according to claim 35, wherein the guide means at the other end of the window means include means for absorbing moments about a substantially horizontal axis extending in the direction of the window means.

* * * * *